Patented June 22, 1954

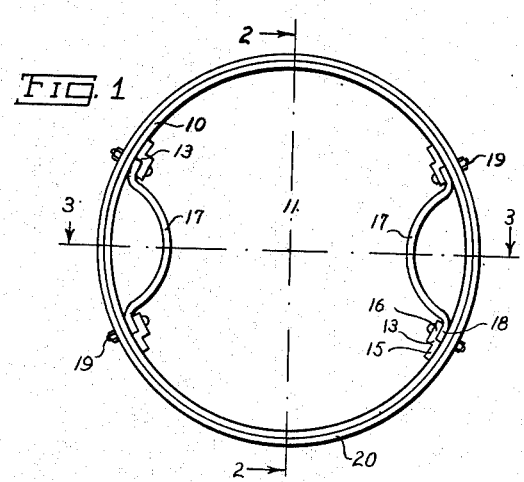
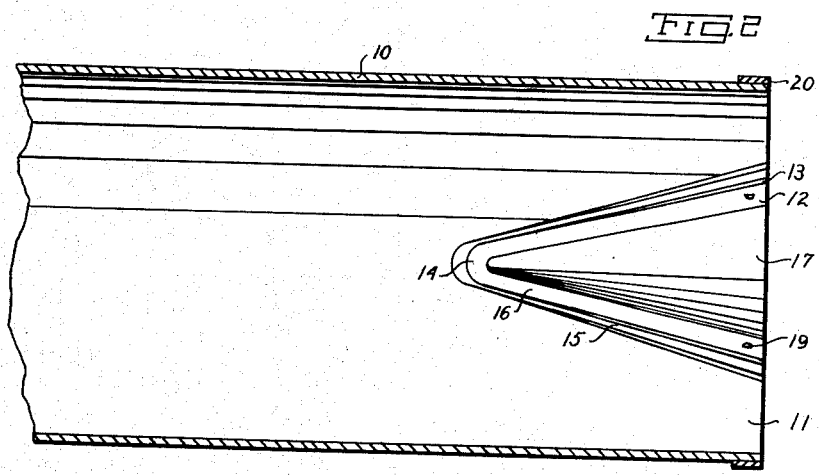
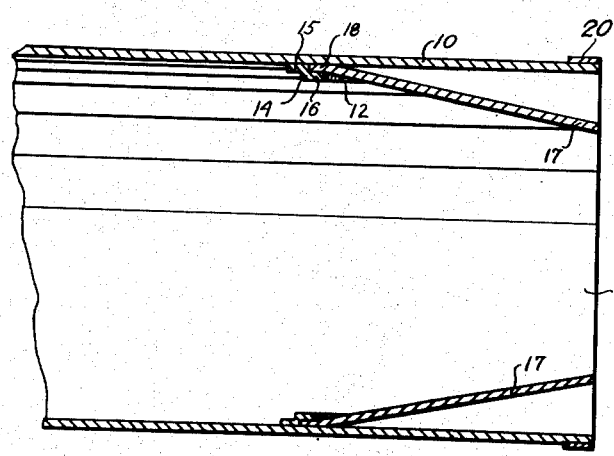

2,681,547

UNITED STATES PATENT OFFICE 2,681,547

MEANS FOR CONTROLLING TEMPERATURE OF EXHAUST GASES OF JET ENGINES

Robert J. MacDonald, Hicksville, N. Y., assignor to Republic Aviation Corporation, near Farmingdale, N. Y., a corporation of Delaware Application November 12, 1947, Serial No. 785,324

10 Claims. (Cl. 60—35.6)

This invention relates generally to temperature controls and specifically contemplates means for controlling the temperature of a gas passing through a conduit or pipe by varying or changing the effective cross-sectional area thereof.

More particularly this invention is designed to control the temperature of the exhaust gases of jet engines especially those comprising power plants on aircraft and proposes means for controlling or predetermining the temperature of the exhaust gases to establish a specific operational temperature for each individual engine to meet varying operational conditions.

Moreover means is contemplated by this invention whereby the effective cross-sectional area of the tail or exhaust pipe of a jet engine may be quickly and easily altered or changed under service conditions so as to predetermine the operating temperature of the engine and of the exhaust gases according to operating conditions or requirements.

It is customary prior to the delivery of an airplane to generally adjust the components thereof to a standard set of operational conditions such as temperature, altitude, etc. and this practice is applied to the exhaust or tail pipe of a jet engine, whereby the effective cross-sectional area of the tail or exhaust pipe is determined and fixed with reference to the cooperating engine under and in accordance with these standard operational conditions. The present invention therefore has as one of its primary objects the provisions of means whereby, under these standard or predetermined operational conditions, the effective cross-sectional area of a tail or exhaust pipe, or of its discharge end or orifice, may be rapidly and accurately adjusted to the cooperating engine without removing or changing the tail-pipe, or in any way requiring the disassembly or dismantling of the airplane or any of its components.

With the above and other objects in view, as will be apparent, this invention consists in the construction and arrangements of parts, all as hereinafter more fully described, claimed and illustrated in the accompanying drawing, wherein:

Fig. 1 is an elevation of the exhaust end of the tail-pipe of a jet engine showing the instant invention installed therein;

Fig. 2 is a longitudinal section taken along line 2—2 of Fig. 1; and

Fig. 3 is also a longitudinal section taken at right angles to Fig. 2 along line 3—3 of Fig. 1.

In the operation of jet engines it is well known that the exhaust gases of the engine are directed through a suitable conduit or conduits, commonly known as tail or exhaust pipes, to be discharged at the end or ends thereof into the atmosphere. To obtain maximum efficiency from the exhaust jet, the length and internal diameter of the exhaust conduit or tail-pipe, as well as the effective cross-sectional area of the pipe or of the exit orifice or exhaust end thereof are computed by presently recognized principles governing the relationship of the thrust developed by the jet to the temperature of the exhaust gases and the effective cross-sectional area of the exit orifice or pipe. In other words the temperature of the exhaust gases or jet is determined, in part at least, by the effective cross-sectional area of the tail or exhaust pipe and it is with this that the present invention is concerned.

Although the approximate effective area of the exit or exhaust orifice of an engine operating under given or known conditions may be readily computed, the optimum area for each engine, under all operating conditions, presents many problems and frequently varies as the operating conditions change. For instance each engine has a "built in" or inherent operational temperature for the jet or exhaust gases that may vary as much as 100° F. between two engines which are presumably structural duplicates. Also the temperature of the air fed or delivered to the intake of the engine appreciably effects the temperature of the exhaust gases. For this reason a plus or minus change in the temperature of the intake air causes sufficient change in the temperature of exhaust gases or jet to sometimes require a change in the effective cross-sectional area of the exhaust or tail pipe in order to maintain the normal or design efficiency of the engine. Furthermore, since the temperature of the exhaust gases is responsive or sensitive to the effective area of the exhaust or tail pipe a relatively small variance in the cross-sectional area of the pipe causes a change in gas temperature. Thus should this area be too small, the temperature of the exhaust gases may be raised to a point where it exceeds the operational temperature limits of the engine and if this area is unduly large the resulting reduction in the temperature of the gases or jet produces corresponding loss of engine efficiency and power. It is apparent, therefore, that the efficient operation of a jet engine depends to a large extent upon the maintenance of the proper effective cross-sectional area of the tail or exhaust pipe.

Among the means presently employed to provide a jet engine with a tail-pipe having a suitable cross-sectional area, especially at the discharge extremity thereof, is to taper the aft end portion of the tail-pipe thereby reducing the area of the exit orifice thereof to a point below the normal or required area. This, of course, will result in raising the temperature of the exhaust gases beyond that required for optimum efficiency or normal operation. By cutting off or removing successive, predetermined parts or graduated sections of the tapered end portion of the tail-pipe, the area of the exit orifice thereof may be gradually increased, and the temperature of the exhaust gases consequently lowered. This "cut and try" method is repeated until the area of the exit orifice for the required temperature is attained. It is to be understood, however, that the area of the exhaust end of the tail-pipe thus created will maintain the desired temperature of the jet or exhaust gases only under the operational conditions existing at the time of the aforesaid adjustment and that as these conditions change it may be advantageous to further adjust the tail-pipe area. Since, once the desired cross-sectional area of the tail-pipe has been determined by the aforesaid method it cannot be reduced, it follows that a supply of tail-pipes must eventually be maintained to meet all changes of operational conditions or of engine.

Another prior method of suiting the cross-sectional area of the tail-pipe to the required temperature for the exhaust gases, or to the engine, is to maintain a stock of tail or exhaust pipes each having a specific and known cross-sectional area for the tail-pipe, or for its discharge or exhaust end and selecting one from this supply which will be best suited to the operating conditions, or to the engine.

Primarily it is desired to select or determine the cross-sectional area of the tail pipe, or of its orifice, for each engine under standard conditions, such as sea level at 70° F. and to that end a series of tail pipes having varying cross-sectional areas for the exhaust or discharge end must be provided from which a selection must be made to coordinate the tail-pipe and engine. If the engine of the airplane is changed it is frequently necessary to change the tail or exhaust pipe to coordinate it with the new engine even under the aforesaid standard conditions.

All of the foregoing occasions requiring adjustment of the tail or exhaust pipe to the engine, or to meet variations in operational conditions, and the prior methods of accomplishing this are awkward, inefficient, expensive and frequently inaccurate.

The instant invention proposes the use of only a single tail-pipe for each engine, and associates with this pipe means whereby the cross-sectional area of the exit orifice or end thereof may be quickly and easily adjusted or changed to meet any or all temperature requirements for the exhaust gases or jet. More specifically, it is proposed to select restrictors from a graduated series designed to predetermine the cross-sectional area of the tail or exhaust pipe when associated therewith. These restrictors have contours, each designed to represent and establish a definite temperature for the exhaust gases or jet within the tail-pipe. For instance, each contour is such that it establishes a different cross-sectional area for the tail pipe when associated therewith and changes in contour cause a variance in the effective area of the exit orifice or end portion of the tail-pipe. Thus, for example, each restrictor differs in contour from every other restrictor and may be so formed as to result in a 10° F. plus or minus change in the temperature of the exhaust gases when positioned within the passage of the exhaust or tail-pipe.

Referring more particularly to the drawings 10 designates the aft portion or discharge end of the tail-pipe of a jet engine the extremity of which serves as the discharge or exit orifice 11. One or more retainers or holders 12 are mounted within the tail-pipe 10, preferably within the end portion thereof to terminate approximately in the plane of the extremity of said pipe. Each holder 12 consists of the sides 13 which at the outer end of the holder are spaced one from the other but which converge inwardly of the tail-pipe to a point of meeting as at 14. The sides 13 may, if desired, be made from a single section of metal stock bent upon itself to create the divergent straight arms 13 integrally united at 14 at their inner or convergent ends. A mounting flange 15 is formed along that edge of each arm 13 situated adjacent the inner face of the pipe 10 and projecting outwardly from the arm to rest flush against the inner surface of said pipe. Similarly a retaining flange 16 is formed along the opposite edge of each arm 13 to project inwardly of the holder and in the opposite direction to the mounting flange 15. Thus the convergent arms 13 of the holder 12 are outwardly circumscribed by the flange 15 resting flush against the inner face of the pipe 10 and are inwardly circumscribed by the retaining flange 16 resting over and spaced from the inner surface of the pipe 10. Each holder is secured in place within the end portion of the tail pipe 10 by permanently attaching the flange 15 thereof to the pipe by spot welding or by any other suitable means. Any number of these holders 12 may be employed within the tail pipe 10 and they are distributed over, and fixedly secured to, the inner surface of pipe 10 so that the open ends thereof face its discharge or exhaust end.

To regulate and determine the cross-sectional area of the tail pipe 10 and/or the exhaust or discharge end orifice thereof, a restrictor 17 is removably mounted or inserted and secured in one or more of the holders 12 permanently attached to the interior face of said pipe as aforesaid. While each restrictor may be of solid metal it is preferably made from a metal sheet bent or curved to simulate the outside contour of a hollow, conic section. In short the metal sheet from which the restrictor 17 is made is so bent or curved that the edges thereof converge similarly to the convergence of the sides 13 of the holder 12, to the end that they are in effect, substantially parallel to said sides 13 when the restrictor 17 coacts with a holder 12. For engagement by and under the retaining flanges 16 of a holder 12 each side or edge of the restrictor 17 and its apex is provided with an outstanding flange 18.

Since the outer end of each holder 12 is open, the flanges 18 of a restrictor 17 may be inserted in the spaces defined by the retaining flanges 16 and sides 13 of the holder in combination with the inner face of the pipe 10. When the restrictor 17 is slid completely into the cooperating holder 12 its point or apex approximately coincides with the junction 14 between the sides 13 of the holder, and the flanges 18 of the restrictor underlie the retaining flanges 16 of the holder throughout their length. When thus positioned the body of the restrictor 17 at its outer end projects into the pipe 10 and gradually slopes inwardly of the pipe toward the inner surface of the pipe as it approaches the apex 14 of the holder. Thus where the restrictor 17 is hollow, as illustrated, the open base or outer end thereof faces in the direction of the flow of gases through the pipe 10 and an unbroken, sloping surface or ramp is presented to the exhaust gases.

In order to secure the restrictor in its operating position the outer ends of the retaining flanges 16 and the underlying outer extremities of the flanges 18 are pierced by the bolts 19 which also pass through the wall of the pipe 10 in alignment with these portions of the flanges 16 and 18. If it is necessary a reinforcing ring 20 may encircle and be welded or otherwise attached to the extreme outer end portion of the pipe 10 to provide a reinforced anchor for the bolts 19 and to prevent damage to the pipe 10 thereby. After removing the bolts 19 the restrictor 17 may be withdrawn from the holder 12 and thus removed and replaced at will.

To provide for a substantial range of control over the temperature of the exhaust gases, the restrictors may be formed in a graduated series, in which the base or end portion of each restrictor is defined by a different radius of curvature. Thus, a restrictor whose base or end portion is defined by large or deep curvature will, when associated with its holder, extend inwardly into the exit orifice or tail pipe to a greater extent than a restrictor whose base portion is defined by a small or shallow curvature. Since the temperature of the exhaust gases may be raised or lowered by decreasing or increasing the effective cross-sectional area of the exit orifice or tail pipe, it is apparent that the insertion of a restrictor having a base portion defined by a large or deep curvature will reduce the effective cross-sectional area of the exit orifice and thus raise the temperature of the exhaust gases.

In applying the present invention, the tail pipe 10 is constructed with an internal diameter sufficiently large to result in an exhaust gas temperature somewhat lower than the required or desired temperature. Upon the first test run of the engine, the first temperature readings of the exhaust gases would indicate the degree of change needed in the cross-sectional area of the pipe 10 or its exit-orifice. A restrictor or restrictors of proper size or displacement to produce the required area would then be inserted and fastened in a holder 12 within the tail-pipe 10, thus reducing the area thereof to establish the required exhaust gas temperature. Any subsequent variance of the cross-sectional area of the pipe or of its exit orifice may be accomplished simply by removing the restrictor and replacing it with a restrictor which will enlarge or further reduce said area as circumstances may require. Manifestly, one or more restrictors 17 may be associated with the tail or exhaust pipe 10 and when two or more are used their combined displacement will determine the reduction in the cross-sectional area of the pipe from the basic structural area thereof.

From the foregoing, it is apparent that the temperature of the exhaust gases of a jet engine may be easily and quickly controlled by inserting one or more restrictors within the tail-pipe of the engine and thus varying the effective cross-sectional area of the tail-pipe or exit orifice thereof. Moreover, the means proposed by the present invention eliminates the necessity of maintaining a surplus number of tail-pipes for each engine, and the need for dismounting or "tearing down" the engine for each change in operational conditions that would necessitate a change of the effective cross-sectional area of the exhaust or tail-pipe in order to maintain the proper temperature requirements of the engine.

What is claimed is:

1. The combination with a conduit having a fixed cross-sectional area, of a holder fixedly secured to and defining a localized area on the inner surface of said conduit, a restrictor adapted to be removably received within said holder to overlie said localized area and to project from the inner surface of the conduit into the passage thereof and thereby reduce the effective cross-sectional area of said conduit, and means for securing said restrictor against removal in said holder and conduit.

2. The combination with a cylindrical exhaust conduit having a fixed cross-sectional area, of a V-shaped holder laterally curved to rest flush against the inner surface of the conduit and formed to be spaced in part from the inner surface of the conduit, a restrictor comprising a hollow conic section, having outstanding flanges along its convergent sides and apex to be received under that part of the holder spaced from the inner surface of the conduit and be thereby slidably and removably mounted in said holder, and fastening means for securing said restrictor within said holder.

3. In an exhaust conduit defining a discharge orifice of fixed cross-sectional area, an open holder mounted on the inner surface of said conduit with its open end immediately adjacent said orifice, a convex restrictor, outstanding flanges upon the sides of said restrictor to be engaged by the holder aforesaid, and means for securing said restrictor in its operative position in said holder.

4. The combination with the exhaust conduit of a jet engine having a fixed cross-sectional area at its discharge end defined and determined by the structure of the conduit, of a series of interchangeable restrictors each having a different displacement value, and means for removably and replaceably mounting each of said restrictors within and adjacent to the discharge end of said conduit whereby the effective cross-sectional area of the conduit at or adjacent its discharge end is a function of the selected restrictor.

5. The combination with the exhaust pipe of a jet engine having a basic cross-sectional area determined and fixed by the structure of said conduit, of means for reducing said basic cross-sectional area comprising at least one holder secured to the inner face of said conduit, and a restrictor removably associated with said holder to project into the passage defined by said conduit, its outer end being spaced from the wall of the conduit and its exposed surface sloping inwardly of the conduit from its outer end toward the inner face of the wall of the conduit.

6. The combination with the exhaust pipe of a jet engine having a basic cross-sectional area determined and fixed by the structure of said conduit, of means for reducing said basic cross-sectional area, comprising at least one holder secured to the inner face of said conduit, and a metallic conic section removably associated with said holder to project into the passage of the conduit at its base and having its apex and sides abutting the inner face of the wall of said conduit.

7. The combination with the exhaust pipe of a jet engine having a basic cross-sectional area determined and fixed by the structure of said conduit, of means for reducing said basic cross-sectional area comprising at least one holder secured to the inner face of said conduit, and a metallic conic section removably associated with said holder with its base toward the discharge end of the conduit and its sides and apex situated inwardly of the conduit with respect to its base and in close proximity to the inner face of the wall of the conduit.

8. Means for determining and adjusting the operational cross-sectional area of the exhaust pipe of a jet engine consisting of a series of restrictors graduated as to displacement, and means immovably mounted within the exhaust pipe for receiving and mounting any combination of said restrictors within the pipe whereby the operational cross-sectional area of the exhaust pipe is determined by the aggregate displacement of all the mounted restrictors.

9. In an exhaust conduit defining a discharge orifice of fixed cross-sectional area, a holder mounted on the inner surface of said conduit immediately adjacent said orifice, a convex restrictor, outstanding flanges upon the sides of said restrictor engaged by the holder aforesaid, and means for securing said restrictor in its operative position in said holder.

10. In an exhaust conduit defining an orifice of fixed cross-sectional area, a holder mounted on the inner surface of said conduit having an open end in substantial alignment with the extremity of said conduit, a convexed restrictor, outstanding flanges upon the sides of said restrictor to be engaged by the holder upon the insertion of the restrictor into the open end of the holder, and means associated with the holder and restrictor for retaining the latter in its operative position in said holder.

References Cited in the file of this patent

UNITED STATES PATENTS

| Number | Name | Date |
|---|---|---|
| 826,517 | Michalk | July 17, 1906 |
| 2,024,274 | Campini | Dec. 17, 1935 |
| 2,076,465 | Kirk | Apr. 6, 1937 |
| 2,332,407 | Spenle | Oct. 19, 1943 |
| 2,383,385 | Heintze | Aug. 21, 1945 |
| 2,411,895 | Poole | Dec. 3, 1946 |
| 2,497,888 | Hirschfelder | Feb. 21, 1950 |
| 2,552,497 | Roach et al. | May 8, 1951 |

FOREIGN PATENTS

| Number | Country | Date |
|---|---|---|
| 831,496 | France | June 7, 1938 |